United States Patent
Panshin et al.

(10) Patent No.: US 11,513,993 B2
(45) Date of Patent: Nov. 29, 2022

(54) LOGIC CIRCUITRY

(71) Applicant: Hewlett-Packard Development Company, L.P., Spring, TX (US)

(72) Inventors: Stephen D. Panshin, Corvallis, OR (US); Scott A. Linn, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 29 days.

(21) Appl. No.: 17/364,052

(22) Filed: Jun. 30, 2021

(65) Prior Publication Data

US 2021/0326297 A1   Oct. 21, 2021

Related U.S. Application Data

(63) Continuation of application No. 16/781,052, filed on Feb. 4, 2020, now Pat. No. 11,068,434, which is a
(Continued)

(51) Int. Cl.
*G06F 13/42* (2006.01)
*B41J 2/175* (2006.01)
(Continued)

(52) U.S. Cl.
CPC ...... *G06F 13/4291* (2013.01); *B41J 2/17546* (2013.01); *G03G 21/1878* (2013.01); *G06F 13/382* (2013.01); *H04N 1/00214* (2013.01)

(58) Field of Classification Search
CPC .............. G06F 13/4291; G06F 13/382; B41J 2/17546; G03G 21/1878; H04N 1/00214
See application file for complete search history.

(56) References Cited

U.S. PATENT DOCUMENTS 4,506,276 A   3/1985   Kyser et al.
4,639,738 A   1/1987   Young et al.
(Continued)

FOREIGN PATENT DOCUMENTS

CL   201900058   6/2019
CL   201900062   6/2019
(Continued)

OTHER PUBLICATIONS

Epson, "Epson provides the best inks for the job," retrieved from https://www.epson.co.nz/microsite/excellence/inks_why.asp, ast retrieved on Jul. 1, 2019, 3 pages.
(Continued)

*Primary Examiner* — Paul R. Myers
(74) *Attorney, Agent, or Firm* — Hanley, Flight & Zimmerman, LLC (57) ABSTRACT

Replaceable print material supply cartridges for printers are disclosed herein. An example replaceable print material supply cartridge includes logic circuitry that is to determine a position of the replaceable print material supply cartridge by initiating a first voltage on a data contact during a time period, monitoring a timer without reference to a clock signal at a clock contact from a serial data bus, and maintaining a first voltage on the data contact for a duration of time. After expiration of the duration, the logic circuitry is to cause the data contact to assume a second voltage, different than the first voltage, and the logic circuitry is to read data from the memory and cause transmission of a data signal via the serial data bus interface.

14 Claims, 5 Drawing Sheets

Related U.S. Application Data continuation of application No. 16/460,016, filed on Jul. 2, 2019, now Pat. No. 10,740,275, which is a continuation of application No. PCT/US2018/063633, filed on Dec. 3, 2018.

(51) Int. Cl.
  *G03G 21/18* (2006.01)
  *G06F 13/38* (2006.01)
  *H04N 1/00* (2006.01)

(56) References Cited

U.S. PATENT DOCUMENTS

| | | | |
|---|---|---|---|
| 5,001,596 A | 3/1991 | Hart | |
| 5,142,909 A | 9/1992 | Baughman | |
| 5,680,960 A | 10/1997 | Keyes et al. | |
| 5,975,688 A | 11/1999 | Kanaya et al. | |
| 6,098,457 A | 8/2000 | Poole | |
| 6,151,041 A * | 11/2000 | Bolash | B41J 2/17546 347/49 |
| 6,190,000 B1 * | 2/2001 | Krouss | B41J 2/04543 347/40 |
| 6,378,977 B1 * | 4/2002 | Gompertz | B41J 29/393 347/14 |
| 6,456,802 B1 | 9/2002 | Phillips | |
| 6,457,355 B1 | 10/2002 | Philipp | |
| 6,494,568 B2 | 12/2002 | Hou et al. | |
| 6,641,240 B2 | 11/2003 | Hsu et al. | |
| 6,648,434 B2 | 11/2003 | Walker et al. | |
| 6,685,290 B1 | 2/2004 | Farr et al. | |
| 6,796,644 B1 | 9/2004 | Anderson, Jr. et al. | |
| 6,802,581 B2 | 10/2004 | Hasseler et al. | |
| 6,959,599 B2 | 11/2005 | Feldstein et al. | |
| 6,966,222 B2 | 11/2005 | Carson et al. | |
| 7,077,506 B2 | 7/2006 | Chen | |
| 7,260,662 B2 | 8/2007 | Moriwaki et al. | |
| 7,444,453 B2 | 10/2008 | Jon | |
| 7,547,082 B2 | 6/2009 | Lee et al. | |
| 8,040,215 B2 | 10/2011 | Zakriti | |
| 8,161,224 B2 | 4/2012 | Laurencin et al. | |
| 8,225,021 B2 | 7/2012 | Adkins et al. | |
| 8,289,788 B2 | 10/2012 | Asauchi | |
| 8,348,377 B2 | 1/2013 | Asauchi | |
| 8,364,859 B2 | 1/2013 | Sato | |
| 8,386,657 B2 | 2/2013 | Adkins et al. | |
| 8,393,721 B2 | 3/2013 | Katoh et al. | |
| 8,429,437 B2 | 4/2013 | Asauchi | |
| 8,454,137 B2 | 6/2013 | Price et al. | |
| 8,558,577 B1 | 10/2013 | Soriano Fosas et al. | |
| 8,591,012 B2 | 11/2013 | Yoshino et al. | |
| 8,793,418 B2 | 7/2014 | Evans | |
| 8,864,277 B2 | 10/2014 | Rice et al. | |
| 8,892,798 B2 | 11/2014 | Tailliet et al. | |
| 8,978,487 B2 | 3/2015 | Fergusson et al. | |
| 8,990,465 B2 | 3/2015 | DeCesaris et al. | |
| 9,213,396 B1 | 12/2015 | Booth et al. | |
| 9,213,927 B1 | 12/2015 | Ahne | |
| 9,298,908 B1 | 3/2016 | Booth et al. | |
| 9,413,356 B1 | 8/2016 | McKinley | |
| 9,454,504 B2 | 9/2016 | Evans | |
| 9,483,003 B2 | 11/2016 | Thacker, III | |
| 9,561,662 B2 | 2/2017 | Ward et al. | |
| 9,582,443 B1 | 2/2017 | Switzer et al. | |
| 9,619,663 B2 | 4/2017 | Refstrup | |
| 9,671,820 B2 | 6/2017 | Maruyama et al. | |
| 9,778,971 B2 | 10/2017 | Michihata et al. | |
| 9,922,276 B2 | 3/2018 | Fister et al. | |
| 10,107,667 B2 | 10/2018 | Cumbie et al. | |
| 10,279,594 B2 | 5/2019 | Horade | |
| 10,572,438 B1 | 2/2020 | Mishra et al. | |
| 10,740,275 B1 | 8/2020 | Panshin et al. | |
| 10,880,454 B2 | 12/2020 | Bush et al. | |
| 11,068,434 B2 | 7/2021 | Panshin et al. | |
| 2002/0012616 A1 | 1/2002 | Zhou et al. | |
| 2002/0027989 A1 * | 3/2002 | Herbert | G07B 17/00508 380/55 |
| 2002/0033855 A1 | 3/2002 | Kubota et al. | |
| 2002/0109761 A1 | 8/2002 | Shimizu et al. | |
| 2002/0129650 A1 | 9/2002 | Zimmerman et al. | |
| 2002/0154181 A1 | 10/2002 | Kubota et al. | |
| 2003/0009595 A1 | 1/2003 | Collins | |
| 2003/0018300 A1 | 1/2003 | Duchon et al. | |
| 2003/0071862 A1 | 4/2003 | Tsukada et al. | |
| 2003/0202024 A1 | 10/2003 | Corrigan | |
| 2004/0036733 A1 | 2/2004 | Kubota et al. | |
| 2004/0085382 A1 | 5/2004 | Kosugi et al. | |
| 2004/0155913 A1 | 8/2004 | Kosugi et al. | |
| 2004/0218023 A1 * | 11/2004 | Ward | B41J 2/17536 347/86 |
| 2005/0010910 A1 | 1/2005 | Lindhorst et al. | |
| 2005/0093899 A1 * | 5/2005 | Kawamura | B41J 2/17526 347/8 |
| 2005/0126282 A1 | 6/2005 | Maatuk | |
| 2005/0229699 A1 | 10/2005 | Chai et al. | |
| 2006/0007295 A1 | 1/2006 | Ueda | |
| 2006/0072952 A1 | 4/2006 | Walmsley et al. | |
| 2006/0110199 A1 | 5/2006 | Walmsley et al. | |
| 2006/0181583 A1 | 8/2006 | Usuda | |
| 2006/0181719 A1 | 8/2006 | Aoki et al. | |
| 2006/0221386 A1 | 10/2006 | Brooks et al. | |
| 2006/0244795 A1 | 11/2006 | Hayasaki et al. | |
| 2006/0268030 A1 | 11/2006 | Walmsley et al. | |
| 2007/0146409 A1 | 6/2007 | Kubota et al. | |
| 2008/0024555 A1 | 1/2008 | Kimura | |
| 2008/0107151 A1 | 5/2008 | Khadkikar et al. | |
| 2008/0129779 A1 | 6/2008 | Walmsley et al. | |
| 2008/0246626 A1 | 10/2008 | Sheafor et al. | |
| 2008/0307134 A1 | 12/2008 | Geissler et al. | |
| 2009/0021766 A1 | 1/2009 | Yamazaki | |
| 2010/0138745 A1 | 6/2010 | McNamara et al. | |
| 2010/0248208 A1 | 9/2010 | Okubo et al. | |
| 2010/0254202 A1 | 10/2010 | Asauchi | |
| 2010/0306431 A1 | 12/2010 | Adkins et al. | |
| 2011/0009938 A1 | 1/2011 | Dowling | |
| 2011/0029705 A1 | 2/2011 | Evans | |
| 2011/0050793 A1 | 3/2011 | Kumagai et al. | |
| 2011/0113171 A1 | 5/2011 | Radhakrishnan et al. | |
| 2011/0115860 A1 * | 5/2011 | Petruchik | B41J 2/1752 347/87 |
| 2011/0131441 A1 | 6/2011 | Asauchi | |
| 2012/0284429 A1 | 11/2012 | Adkins et al. | |
| 2013/0054933 A1 | 2/2013 | Fister et al. | |
| 2013/0067016 A1 | 3/2013 | Adkins et al. | |
| 2013/0155142 A1 | 6/2013 | Browning et al. | |
| 2014/0040517 A1 | 2/2014 | Fister et al. | |
| 2014/0095750 A1 | 4/2014 | Tailliet | |
| 2014/0164660 A1 | 6/2014 | DeCesaris et al. | |
| 2014/0211241 A1 | 7/2014 | Rice et al. | |
| 2014/0337553 A1 | 11/2014 | Du et al. | |
| 2014/0351469 A1 | 11/2014 | Fister et al. | |
| 2014/0372652 A1 | 12/2014 | Shu | |
| 2015/0074304 A1 | 3/2015 | Adkins et al. | |
| 2015/0089630 A1 | 3/2015 | Lee | |
| 2015/0343792 A1 | 12/2015 | Refstrup | |
| 2015/0347336 A1 | 12/2015 | Uekuri | |
| 2016/0055402 A1 | 2/2016 | Fister et al. | |
| 2016/0098359 A1 | 4/2016 | Adkins et al. | |
| 2016/0357691 A1 | 12/2016 | Ahne | |
| 2016/0364305 A1 | 12/2016 | Pitigoi-Aron | |
| 2017/0032135 A1 | 2/2017 | Refstrup | |
| 2017/0189011 A1 | 7/2017 | Stone et al. | |
| 2018/0004541 A1 | 1/2018 | Jang et al. | |
| 2018/0050537 A1 | 2/2018 | Bakker et al. | |
| 2018/0100753 A1 | 4/2018 | Cumbie et al. | |
| 2018/0157943 A1 | 6/2018 | Fister et al. | |
| 2018/0264808 A1 | 9/2018 | Bakker et al. | |
| 2018/0281438 A1 | 10/2018 | Horade et al. | |
| 2018/0302110 A1 | 10/2018 | Solan | |
| 2019/0011306 A1 | 1/2019 | Cumbie et al. | |
| 2019/0012663 A1 | 1/2019 | Masters | |
| 2019/0013731 A1 | 1/2019 | Gritti | |
| 2019/0023020 A1 | 1/2019 | Anderson | |

(56) References Cited

U.S. PATENT DOCUMENTS

| | | | |
|---|---|---|---|
| 2019/0061347 A1 | 2/2019 | Bakker et al. | |
| 2019/0217628 A1 | 7/2019 | Horade et al. | |
| 2021/0097018 A1 | 4/2021 | Panshin et al. | |

FOREIGN PATENT DOCUMENTS

| | | | |
|---|---|---|---|
| CL | 202101221 A1 | 10/2021 | |
| CL | 2021001189 A1 | 10/2021 | |
| CN | 2603934 | 2/2004 | |
| CN | 1581026 | 2/2005 | |
| CN | 102037454 | 4/2011 | |
| CN | 104915317 | 9/2015 | |
| EP | 0941856 A2 | 9/1999 | |
| EP | 0994779 | 4/2000 | |
| EP | 1164022 | 12/2001 | |
| EP | 1285764 | 9/2002 | |
| EP | 1285764 | 2/2003 | |
| EP | 1389531 | 2/2004 | |
| EP | 1238811 | 12/2006 | |
| EP | 1238811 B1 | 12/2006 | |
| EP | 2237163 | 10/2010 | |
| EP | 2854063 | 4/2014 | |
| EP | 3208736 | 8/2017 | |
| JP | 05-289778 A | 11/1993 | |
| JP | 08-181686 A | 7/1996 | |
| JP | 2007-018288 A | 1/2007 | |
| JP | 2011-168004 A | 9/2011 | |
| JP | 2011525004 | 9/2011 | |
| JP | 2015-502114 A | 1/2015 | |
| JP | 2015-130147 A | 7/2015 | |
| JP | 2018-116423 A | 7/2018 | |
| RU | 171656 U1 | 6/2017 | |
| RU | 2654179 C1 | 5/2018 | |
| WO | 98/55318 A1 | 12/1998 | |
| WO | 2013048430 | 4/2013 | |
| WO | 2015/016860 A1 | 2/2015 | |
| WO | 2016/028272 A1 | 2/2016 | |
| WO | 2016114759 | 7/2016 | |
| WO | 2016130157 | 8/2016 | |
| WO | 2017074342 | 5/2017 | |
| WO | 2017174363 | 10/2017 | |
| WO | 2017189009 | 11/2017 | |
| WO | 2017189010 | 11/2017 | |
| WO | 2017189011 | 11/2017 | |
| WO | 2017189013 | 11/2017 | |
| WO | 2018/009235 A1 | 1/2018 | |
| WO | 2018017066 | 1/2018 | |
| WO | 2018199886 | 11/2018 | |
| WO | 2018199891 | 11/2018 | |
| WO | 2019078835 | 4/2019 | |
| WO | 2019078839 | 4/2019 | |
| WO | 2019078840 | 4/2019 | |
| WO | 2019078843 | 4/2019 | |
| WO | 2019078844 | 4/2019 | |
| WO | 2019078845 | 4/2019 | |
| WO | 2020/117196 A1 | 6/2020 | |
| WO | 2020/117297 A1 | 6/2020 | |

OTHER PUBLICATIONS

NXP "Introducing A10006 Secure Authenticator Tamper-Resistant Anti Counterfeit Solution", last retrieved on Jul. 3, 2019, 29 pages.
United States Patent and Trademark Office, "Non-Final Office action," issued in connection with U.S. Appl. No. 16/505,090, dated Sep. 10, 2019, 20 pages.
United States Patent and Trademark Office, "Notice of Allowance," issued in connection with U.S. Appl. No. 16/505,090, dated Feb. 12, 2020, 9 pages.
United States Patent and Trademark Office, "Notice of Allowance," issued in connection with U.S. Appl. No. 16/505,090, dated Oct. 22, 2019, 5 pages.
International Searching Authority "International Search Report and Written Opinion" issued in connection with PCT/US2019/017511 dated Dec. 3, 2018, 12 pages.
International Searching Authority "International Search Report and Written Opinion" issued in connection with PCT/US2018/063624 dated Aug. 23, 2019, 13 pages.
International Searching Authority "International Search Report and Written Opinion" issued in connection with PCT/US2018/063630 dated Aug. 22, 2019, 15 pages.
International Searching Authority "International Search Report and Written Opinion" issued in connection with PCT/U S2019/026159 dated Aug. 15, 2019, 15 pages.
International Searching Authority "International Search Report and Written Opinion" issued in connection with PCT/US2019/026161 dated Aug. 23, 2019, 20 pages.
International Searching Authority "International Search Report and Written Opinion" issued in connection with PCT/US2018/063643 dated Aug. 20, 2019, 13 pages.
International Searching Authority "International Search Report and Written Opinion" issued in connection with PCT/US2019/026145 dated Sep. 5, 2019, 16 pages.
International Searching Authority "International Search Report and Written Opinion" issued in connection with PCT/US2019/026154 dated Sep. 5, 2019, 16 pages.
International Searching Authority "International Search Report and Written Opinion" issued in connection with PCT/US2019/026124 dated Aug. 26, 2019, 15 pages.
International Searching Authority "International Search Report and Written Opinion" issued in connection with PCT/US2019/026133 dated Aug. 26, 2019, 18 pages.
International Searching Authority "International Search Report and Written Opinion" issued in connection with PCT/US2018/063633 dated Jul. 23, 2019, 12 pages.
International Searching Authority "International Search Report and Written Opinion" issued in connection with PCT/US2018/063631 dated Aug. 23, 2019, 13 pages.
United States Patent and Trademark Office, "Non-Final Office action," issued in connection with U.S. Appl. No. 16/460,016, dated Sep. 12, 2019, 12 pages.
United States Patent and Trademark Office, "Restriction Requirement," issued in connection with U.S. Appl. No. 16/502,479, dated Aug. 15, 2019, 7 pages.
United States Patent and Trademark Office, "Non-Final office action ," issued in connection with U.S. Appl. No. 16/502,479, dated Dec. 11, 2019, 13 pages.
United States Patent and Trademark Office, "Notice of Allowance ," issued in connection with U.S. Appl. No. 16/502,479, dated Apr. 9, 2020, 9 pages.
United States Patent and Trademark Office, "Notice of allowance," issued in connection with U.S. Appl. No. 16/460,016, dated Mar. 25, 2020, 10 pages.
Arnostech, "Thermal Inkjet Printers," retrieved from http://www.arnostech.com/machines/coding-systems/thermal-inkjet-printers/, last retrieved on Jul. 1, 2019, 3 pages.
HP, "Development of the HP DeskJet 1200C Print Cartridge Platform", Feb. 1994, 9 pages.
Reddit, "Use an accelerometer to measure Z wobble", last retrieved on Jul. 1, 2019, https://www.reddit.com/r/Reprap/comments/6qsoyd/use_an_accelerometer_to_measure_z_wobble/, 3 pages.
United States Patent and Trademark Office, "Notice of Allowance," issued in connection with U.S. Appl. No. 16/728,207, dated Feb. 19, 2020 19 pages.
NXP Semiconductors N.V. "PCA9641: 2-channel I2C-bus master arbiter Product data Sheet" released Oct. 23, 2014, 77 pages.
NXP Semiconductors N.V. "NXP 2-, 4-, and 8-channel I2C/SMBus muxes and switches PCA954x" released Apr. 1, 2014, 34 pages.
Maxim Integrated Products "1-to-8 I2C Bus Switches/Multiplexers with Bus Lock-Up Detection, Isolation, and Notification" dated Sep. 2008, 22 pages.
The I2C-Bus Specification Version 2.Jan. 1, 2000 (Year: 2000).
United States Patent and Trademark Office, "Notice of Allowance," issued in connection with U.S. Appl. No. 16/460,016, dated Dec. 13, 2019, 6 pages.

(56) References Cited

OTHER PUBLICATIONS

United States Patent and Trademark Office, "Notice of Allowance," issued in connection with U.S. Appl. No. 16/781,052, dated Jun. 18, 2021, 10 pages.

United States Patent and Trademark Office, "Notice of Allowance," issued in connection with U.S. Appl. No. 16/781,052, dated Mar. 16, 2021, 5 pages.

United States Patent and Trademark Office, "Non-Final Office action," issued in connection with U.S. Appl. No. 16/781,052, dated Nov. 24, 2020, 7 pages.

* cited by examiner

LOGIC CIRCUITRY

RELATED APPLICATIONS

This patent arises from a continuation of U.S. patent application Ser. No. 16/781,052, which was filed on Feb. 4, 2020, which is a continuation of U.S. patent application Ser. No. 16/460,016, which was filed on Jul. 2, 2019, which is a continuation of International Patent Application No. PCT/US18/63633, which was filed on Dec. 3, 2018. Priority is claimed to U.S. patent application Ser. No. 16/781,052, U.S. patent application Ser. No. 16/460,016, and International Patent Application No. PCT/US18/63633. U.S. patent application Ser. No. 16/781,052, U.S. patent application Ser. No. 16/460,016, and International Patent Application No. PCT/US18/63633 are hereby incorporated by reference in their entireties.

BACKGROUND

Serial data bus protocols such as Inter-integrated Circuits ($I^2C$, or I2C, which notation is adopted herein) protocol and Serial Peripheral Interface (SPI) protocol allow at least one 'master' integrated circuit (IC) to communicate with at least one 'slave' IC, for example via a bus. I2C, and other communications protocols, communicate data according to a clock period. For example, a voltage signal may be generated, where the value of the voltage is associated with data. For example, a voltage value above x may indicate a logic "1" whereas a voltage value below x volts may indicate a logic "0", where x is a predetermined numerical value. By generating an appropriate voltage in each of a series of clock periods, data can be communicated via a bus or another communication link.

Some 2D and 3D printing systems include one or more replaceable print apparatus components, such as print material containers (e.g. inkjet cartridges, toner cartridges, ink supplies, build material supplies etc.), inkjet printhead assemblies, and the like. In some examples, logic circuitry associated with the replaceable print apparatus component(s) communicate with logic circuitry of the print apparatus in which they are installed, for example communicating information such as their identity, capabilities, status and the like.

In some examples, these communications utilize I2C communications. In such examples, the master IC may generally be provided as part of the print apparatus (which may be referred to as the 'host') and a replaceable print apparatus component would comprise a 'slave' IC, although this need not be the case in all examples. There may be a plurality of slave ICs connected to an I2C communication link (for example, containers of different colors of print agent). The slave IC(s) may comprise logic circuitry to perform data operations before responding to requests from logic circuitry of the print system.

In some examples, it may be intended to detect the physical location of slave devices that are attached along a serial bus. It may, for example, be intended that devices such as replaceable print apparatus components occupy a certain designated physical position within a print apparatus. For example, in a printing apparatus with ink supply devices attached to a serial bus, there may be an expected position for, for example, a black cartridge, a yellow cartridge, a cyan cartridge and a magenta cartridge, each of which may have a particular address under a communications protocol. By detecting whether specific ink color cartridges have been misinstalled or swapped, printing with incorrect or intended colors may be prevented. A prior patent disclosure is US patent application publication number US 2011/0029705.

BRIEF DESCRIPTION OF DRAWINGS

Non-limiting examples will now be described with reference to the accompanying drawings, in which.

DETAILED DESCRIPTION

Some examples of applications of I2C communications are described herein in the context of print apparatus. However, not all the examples are limited to such applications, and at least some of the principles set out herein may be used in other contexts.

In some examples, logic circuitry within a print apparatus may receive information from logic circuitry associated with a replaceable print apparatus component via a communications interface, and/or may send commands to the replaceable print apparatus component. Example print apparatuses include two-dimensional imaging apparatus and three-dimensional additive manufacturing apparatus such as inkjet printers, dry toner printers, liquid toner printers, 3D powder bed inkjet printers, etc. Example print apparatus components include ink tanks; ink bottles; printheads; inkjet printhead cartridges; dry toner reservoirs; dry toner cartridges; photoconductor cartridges; process cartridges; liquid toner reservoirs; three-dimensional printing agents including inks, stimulating agents, adhesives, inhibitors, etc.; three-dimensional printing build material; print apparatus service components; and/or any other component that may be replaceable with respect to a host print apparatus and may or may not contain print material. In this disclosure, print material or print agent may include ink, dry or liquid toner, three-dimensional printing agents, three-dimensional build material (plastics, metal, etc.), fibers, etc. The reservoirs mentioned above may contain a colored print material.

Communications between print apparatus and replaceable print apparatus components installed in the apparatus may provide various functions. For example, the identity, functionality and/or status of a replaceable print apparatus component and/or the logic circuitry associated therewith may be communicated to logic circuitry of a print apparatus via a communications interface. For example, a logic circuit associated with (or provided on or in) a print agent container may communicate an identity such as a product serial number and/or a brand, and/or identifying characteristics such as color, color map, color map reconstruction recipe, maximum print agent volume, or functionality to a print apparatus in which it is installed, see for example international patent application publication Nos. WO2016028272, WO2018/009235 or WO2015016860 or European patent publication No. EP0941856. A status, such as a fill level, may be provided via a communications interface, for example such that a print apparatus may generate an indication of the fill level to a user. In some examples, a validation process may be carried out by a print apparatus. For example, the print apparatus may verify that a replaceable print apparatus component originates from an authorized source, so as to ensure the quality thereof. For example, logic circuitry associated with a replaceable print apparatus component may store secret keys and may be configured to generate session keys, session key identifiers and/or message authentication codes for generating authenticated cryptographic responses to the printer, see for example U.S. Pat. No. 9,619,663. The logic may also include further authentication mechanisms such as dedicated hardware for calculating responses within predefined, relatively short, time windows, see for example U.S. Pat. No. 9,561,662. In some examples, the validation process may include an integrity check to ensure that the replaceable print apparatus component and/or the logic circuitry associated therewith is functioning as expected.

In turn, instructions to perform tasks may be sent to logic circuitry of a print apparatus component from logic circuitry associated with a print apparatus via the communications interface. For example, these may include instructions to perform an authentication or encryption function, a print material level sensing function, printing tasks, or other tasks.

In at least some of the examples described below, a logic circuitry package is described. The logic circuitry package may be associated with a replaceable print apparatus component, for example being affixed thereto, or arranged at least partially within the housing thereof, and is adapted to communicate data with a print apparatus controller via a bus provided as part of the print apparatus.

A 'logic circuitry package' as the term is used herein refers to one or more logic circuits that may be interconnected or communicatively linked to each other. Where more than one logic circuit is provided, these may be encapsulated as a single unit, or may be separately encapsulated, or not encapsulated, or some combination thereof. Each package may be configured to communicate via a serial bus interface.

In some examples, each logic circuitry package is provided with at least one processor and memory. In one example the logic circuitry package may be, or may function as, a microcontroller or secure microcontroller. In use, the logic circuitry package may be adhered to or integrated with the replaceable print apparatus component.

In some examples, the logic circuitry package may respond to various types of requests (or commands) from a host (e.g. a print apparatus). A request may comprise a request for data, for example identification and/or authentication information (for example, a 'read' request). In other examples, a request may comprise a 'write' request. Another request from a host may be a request to perform an action, such as performing at least one measurement or carrying out a printing task or the like. Another type of request may be a request for a data processing action.

In an example of an interaction, a host may send a command to a logic circuitry package associated with a replaceable print apparatus component, which may perform the command and load resulting data into a memory (in some examples, into a buffer and/or a specific register of a memory). A host may send a further command to read the response, whereby the response is transmitted as serial data over a connected bus. Such a process could be used, for example, to acquire data held in a memory of the logic circuitry package. For example, the first request may be a request for an identifier of that package, and may result in the package loading the identifier into a memory buffer. A subsequent 'read' request may result in the data being read out of the buffer and transmitted as a serial data signal.

In at least some examples, a plurality of such logic circuitry packages (each of which may be associated with a different replaceable print apparatus component) may be connected to an I2C bus.

Figure 1:
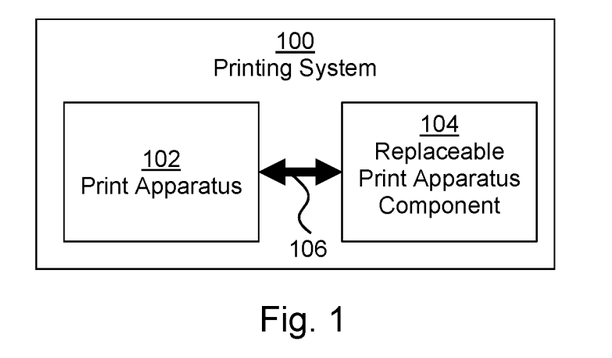
FIG. 1 is an example of a printing system.

FIG. 1 is an example of a printing system 100. The printing system 100 comprises a print apparatus 102 in communication with a replaceable print apparatus component 104 via a communications link 106. Although for clarity, the replaceable print apparatus component 104 is shown as external to the print apparatus 102, in some examples, the replaceable print apparatus component 104 may be housed within the print apparatus. The print apparatus 102 may be any type of 2D print apparatus or 3D print apparatus.

The replaceable print apparatus component 104 may for example contain a consumable resource of the print apparatus 102, or a component which is likely to have a lifespan which is less (in some examples, considerably less) than that of the print apparatus 102. For example, the print apparatus component 104 may physically store ink, toner, 3D print agent or 3D print build powder and may be intended to be replaced after substantial exhaustion. The replaceable print apparatus component 104 may for example comprise a print material container or cartridge (which may be a build material container for 3D printing, or a liquid print agent container for 2D or 3D printing). In some examples the replaceable print apparatus component 104 may comprise a print head or other dispensing component. While a single replaceable print apparatus component 104 is shown in this example, in other examples, there may be a plurality of replaceable print apparatus components, for example comprising print agent containers of different colors, print heads (which may be integral to the containers), or the like.

In some examples, the communications link 106 may comprise a serial bus, for example an I2C capable or compatible bus (herein after, an I2C bus).

Figure 2:
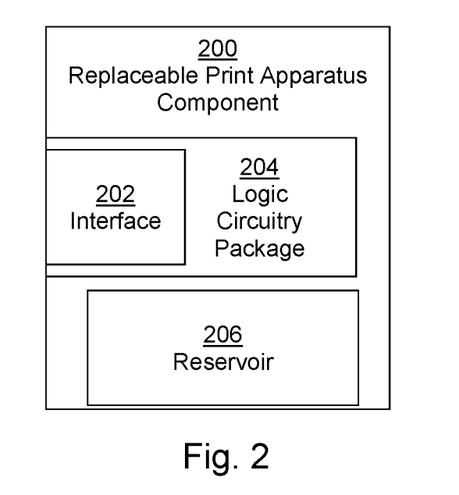
FIG. 2 is an example of a replaceable print apparatus component.

FIG. 2 shows an example of a replaceable print apparatus component 200, which may provide the replaceable print apparatus component 104 of FIG. 1. The replaceable print apparatus component 200 comprises a data interface 202 integrated into a logic circuitry package 204. In use of the replaceable print apparatus component 200, the logic circuitry package 204 decodes data received via the data interface 202. The data interface 202 may comprise an I2C interface.

In some examples, the logic circuitry package 204 may be further configured to encode data for transmission via the data interface 202. In some examples, there may be more than one data interface 202 provided for a single component 200.

In some examples, the logic circuitry package 204 may be configured to act as a 'slave' in I2C communications.

The replaceable print apparatus component 200 in this example comprises a print material reservoir 206, which may contain any of the examples of print materials discussed above.

Figure 3:
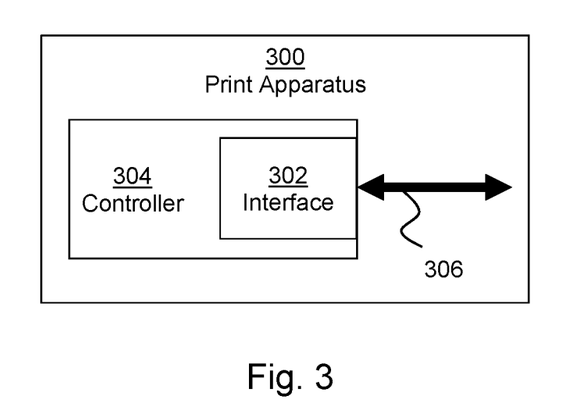
FIG. 3 shows an example of a print apparatus.

FIG. 3 shows an example of a print apparatus 300. The print apparatus 300 may provide the print apparatus 102 of FIG. 1. The print apparatus 300 comprises a controller 304 which comprises an interface 302 for communicating with a replaceable print apparatus component and a communications bus 306. The controller 304 comprises logic circuitry. In some examples, the interface 302 is an I2C interface and the communications bus 306 is an I2C capable communications bus.

In some examples, controller 304 may be configured to act as a host, or a master, in I2C communications. The controller 304 may generate and send commands to at least one replaceable print apparatus component 200, and may receive and decode responses received therefrom.

Such print apparatus 102, 300 and replaceable print apparatus component(s) 104, 200, and/or the logic circuitry package thereof, may be manufactured and/or sold separately. In an example, a user may acquire a print apparatus 102, 300 and retain the apparatus 102, 300 for a number of years, whereas a plurality of replaceable print apparatus components 104, 200 may be purchased in those years, for example as print agent is used in creating a printed output. Therefore, there may be at least a degree of forwards and/or backwards compatibility between print apparatus 102, 300 and replaceable print apparatus components 104, 200.

Figure 4:
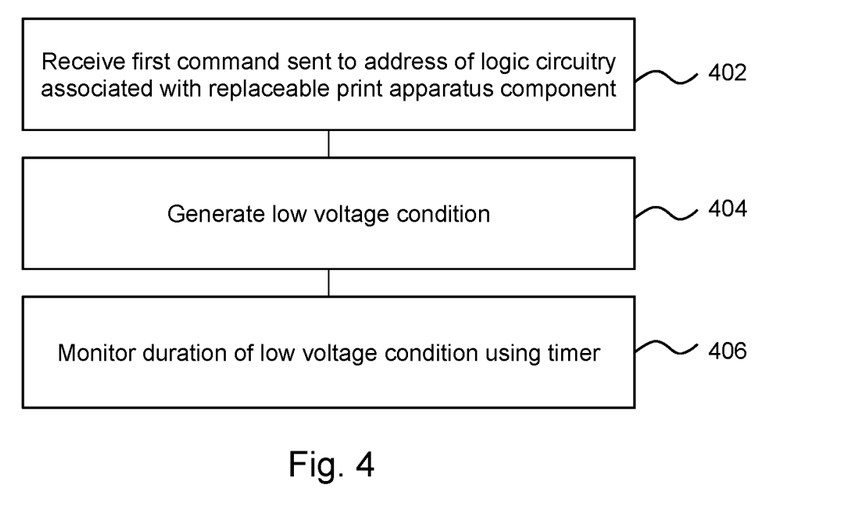
FIG. 4 shows an example of a method of operation of logic circuitry associated with a replaceable print apparatus component.

FIG. 4 is an example of a method which may be carried out by a logic circuitry package associated with a replaceable print apparatus component. In some examples, the method may be carried out such that a print apparatus in which the replaceable print apparatus component is installed may determine the physical location of the replaceable print apparatus component. While the methods set out herein could be used with communications protocols other than I2C, such as Serial Peripheral Interface (SPI) protocol, it may be noted that in I2C protocols, a plurality of devices are connected serially on a single bus without any means of immediately determining or declaring their physical location or order. However, when considering for example SPI, there are two wiring configurations, parallel and daisy-chained. In the parallel wiring configuration, there is a separate line dedicated to each 'slave' logic circuit and in the daisy-chained configuration, the devices are wired sequentially in a specific order, so their relative position may be validated in some other way. Therefore, the method set out herein may have particular utility with protocols in which it is otherwise difficult to verify a physical location of a device, such as I2C. However, it is not limited thereto.

Block 402 comprises receiving a first command sent to an address of logic circuitry associated with a replaceable print apparatus component via a serial data bus, for example an I2C bus. In some examples, the first command may be indicative of an operation mode. In some examples, the first command may be indicative of a time period. The address may be an I2C bus interface address, stored and/or hardwired to the logic circuitry/logic circuitry package. The first command may be sent to the address by a controller of the print apparatus. The first command may be a predetermined command.

Block 404 comprises generating, by the logic circuitry, a low voltage condition on the serial data bus. As is set out in greater detail below, this may comprise, effectively, providing a connection between the serial data bus (and more particularly, a data line of the serial data bus) and ground. In one example low voltage is a nominal ground or reference voltage such as approximately 0V. As will also be set out below, the low voltage is lower than a high or default voltage state or condition.

Block 406 comprises monitoring the duration of the low voltage condition using a timer of the logic circuitry. The timer may comprise an integral timer, internal to the logic circuitry, for example comprising a Resistance-Capacitor (RC) circuit configured to act as a timer, logic gates configured with a counter, a crystal or a ring oscillator, a phase lock loop (also known as a phase-locked loop) or the like, or any timer which logically forms part of a logic circuitry provided in association with the replaceable print apparatus component. The timer may provide an internal clock signal which is provided even in the absence of a clock signal on the serial data bus. The timer may count and thus allow for determination of the duration of the timer period specified in the first command.

The timer may be dedicated to measuring the time period of the command. In certain example, the timer is dedicated to measure time irrespective of other, general purpose cycles in an operating I2C logic circuitry package such as the I2C clock cycles and/or the processing cycles of a central processing unit of a host apparatus or of the logic circuitry. For example, the timer may be configured to count faster than the clock frequency and may start and stop counting irrespective of a clock signal timing. The timer can be configured to count irrespective of a processor speed of the central processing unit of the logic circuitry/host apparatus, for example having nominal specifications unrelated to the central processing unit.

In other examples, the logic circuitry/logic circuitry package may monitor the time period based on monitoring an external timer such as the external clock, or by monitoring external or internal wave signals, oscillating signals, etc. which in certain instances could be suitable to determine the duration of the time period. In one example, the timer of the logic circuitry package may be a timer which is wirelessly linked with the logic circuitry (and as such, one timer could be shared by more than logic circuitry).

The method may comprise releasing the bus, or removing the low voltage condition, at the end of a time period such that the serial data bus assumes a different, high and/or default, voltage state or condition). This may for example comprise interrupting a connection to ground. Outside of the time period, e.g., before and after the duration of the time period as initiated in response to the first command, the logic circuitry/logic circuitry package may generate a high voltage condition. Alternatively, such a high voltage condition may a default condition created by including a 'pull up' resistor on the bus, as is described below.

To consider, for example, an I2C data bus, this comprises two communications lines: a serial data line (SDA) and a serial clock line (SCL). SDA and SCL may be bidirectional lines, connected to a positive supply voltage via a current-source or pull-up resistor.

Absent a signal on the line (i.e. absent a clock signal on the SCL and/or absent a data signal on the data line) both lines may be by default in a HIGH voltage state. The exact value of the voltage in the high voltage state depends on many operational factors, but in some examples may be a few volts, for example between around 3 and 6 volts. Therefore, while in general the 'high' voltage may be relatively low, this is high compared to a low' voltage state of the bus, which may for example be less than 1 volt.

The master/host device (for example in the present context, processing circuitry or a controller of a print apparatus in which the replaceable print apparatus is installed) may generate a clock signal by pulling the voltage of the SCL line down to a LOW state, for example using an open-drain configuration to, in effect, provide a short circuit to ground. For example, a switch (such as a field effect transistor) may be activated (closed) to cause a low voltage state, then reopened to allow a pull-up resistor on the line to pull the voltage up to the HIGH state. In other examples, an open-collector configuration may be used in which a Bipolar Junction Transistor (BJT) may be used for a similar effect. The timing of the pull-down and release provides a clock signal which is controlled by the processing circuitry of the master device.

In order to transmit data, either the master device or the slave (in this example the logic circuitry associated with the replaceable print apparatus) may selectively control the voltage on the SDA in a similar way by pulling it LOW (e.g. providing a connection to ground) or allowing it to 'float HIGH' (e.g. interrupting the connection to ground). This is timed with the clock signal: according to the I2C protocol, the state of the SDA line when the SCL line is HIGH provides at least one data bit. Usually, if the SDA line is LOW (and stable) when the SCL is HIGH, this signifies a binary 0 and if the SDA line is HIGH (and stable) when the SCL is HIGH, this signifies a binary 1, although this is a matter of convention so could, in a given system, be changed.

In one example of the method of FIG. 4, rather than providing a data signal which is timed to coincide with the SCL line being high, the state of the SCL line is not considered. Instead, the voltage is pulled low for a duration which is monitored by a timer of the logic circuitry (again, for example by providing a connection to ground), then 'released', or allowed to assume the default HIGH state (for example by interrupting that connection). Indeed, in some embodiments, there may be no clock signal provided by the master device for at least part, and in some examples, the whole of, the duration of the low voltage condition.

As mentioned above, this method may be of use in the context of detecting the physical location of replaceable print apparatus components, as is now described with reference to FIG. 5. For example, this method may be of use in detecting if a replaceable print apparatus component such as a print material supply is installed in an intended position. In some examples, this may remove or reduce the use of 'mechanical keying', in which a replaceable print apparatus component is shaped particularly to match a 'slot' having a complementary shape. This in turn reduces manufacturing complexities, as the replaceable print apparatus components, for example of different print material types such as different colours, may have a common physical design. In some examples, a combination of mechanical keying and the techniques described herein may be used. For example, as in some applications, black (K) colorant tends to be dispensed more often than other colors (for example, in contexts where text is often to be printed), black print material supply cartridges may be physically larger than, for example, cyan, magenta or yellow print material supply cartridges in a CMYK cartridge set. Therefore, in some examples, mechanical keying (e.g. by the sheer size of the black cartridge versus the other colours) may be used for a black cartridge, which may be sufficient to ensure that the black cartridges are placed in the intended 'slot', and the techniques described herein may be used to ensure that that cartridges of other colors are places as intended.

In some examples, a time period monitoring function, for example by the timer, may be used for other purposes. For example, the logic circuitry package may be configured to have more than one I2C address, for example to facilitate communication with different logic circuits or different functions comprised in the package over the same I2C bus interface of the logic circuitry package (e.g. via the same single data interconnect pad, and the same single power pad, the same single ground pad and/or the same single clock pad). For example the default data read/write communications and low voltage generation and/or detection may be associated with a primary address of the logic circuit package, which is the earlier mentioned package address. The logic circuitry package may be adapted to be able to temporarily "switch" (i.e. respond to commands directed thereto) to a secondary, e.g., temporary, I2C address upon receiving a corresponding command. This command may include a second time period. This second time period may be monitored by the logic circuitry package, for example using the timer, to determine the time during which the logic circuitry package is to respond to commands received via the secondary address. For example, the logic circuitry may be associated with the primary address for a first time period and the secondary address for a second time period, wherein the second time period may be monitored using the timer. In this context, the first time period may be any time period outside of the second time period. In certain practical examples, this second time period may be longer than the time period for generating the low voltage condition, to facilitate sufficient time for data communication via the secondary address, which time period may be longer than, e.g., a replaceable print apparatus component installation location detection of this disclosure. Activating at least one different address may comprise setting (e.g. writing, re-writing or changing), or triggering the setting of, a different address (for example, a temporary second address), for example by writing the different address in a portion of memory which is indicative of an address of the logic circuitry package.

The logic circuitry may be configured to provide a first set of responses, or to operate in a first mode, in response to instructions sent to a first address and to provide a second set of responses, or to operate in a second mode, in response to instructions sent to a secondary address. In other words, the address may trigger different functions provided by the circuitry. In some examples, the first set of responses is accessible in response to commands sent to the first address and not in response to commands sent to the secondary address and the second set of responses is available in response to commands sent to the secondary address and not in response to commands sent to the first address. In some examples, the first set of first set of responses may be cryptographically authenticated (e.g. accompanied by a message authentication, or otherwise cryptographically 'signed', and/or encrypted) and the second set of responses is not cryptographically authenticated. In some examples, such as second address may be utilised to access other cells or sensors or the like, which may be provided on or otherwise associated with, the logic circuitry.

By multi-purposing the time period monitoring function, the times for executing these multiple tasks (e.g. location detection and secondary address communication) can be specified dependent of each print apparatus platform characteristics, for example including speed, capabilities, logic circuitry package specifications, number of potential connectable replaceable components to a single bus, bus speed, etc.

Figure 5:
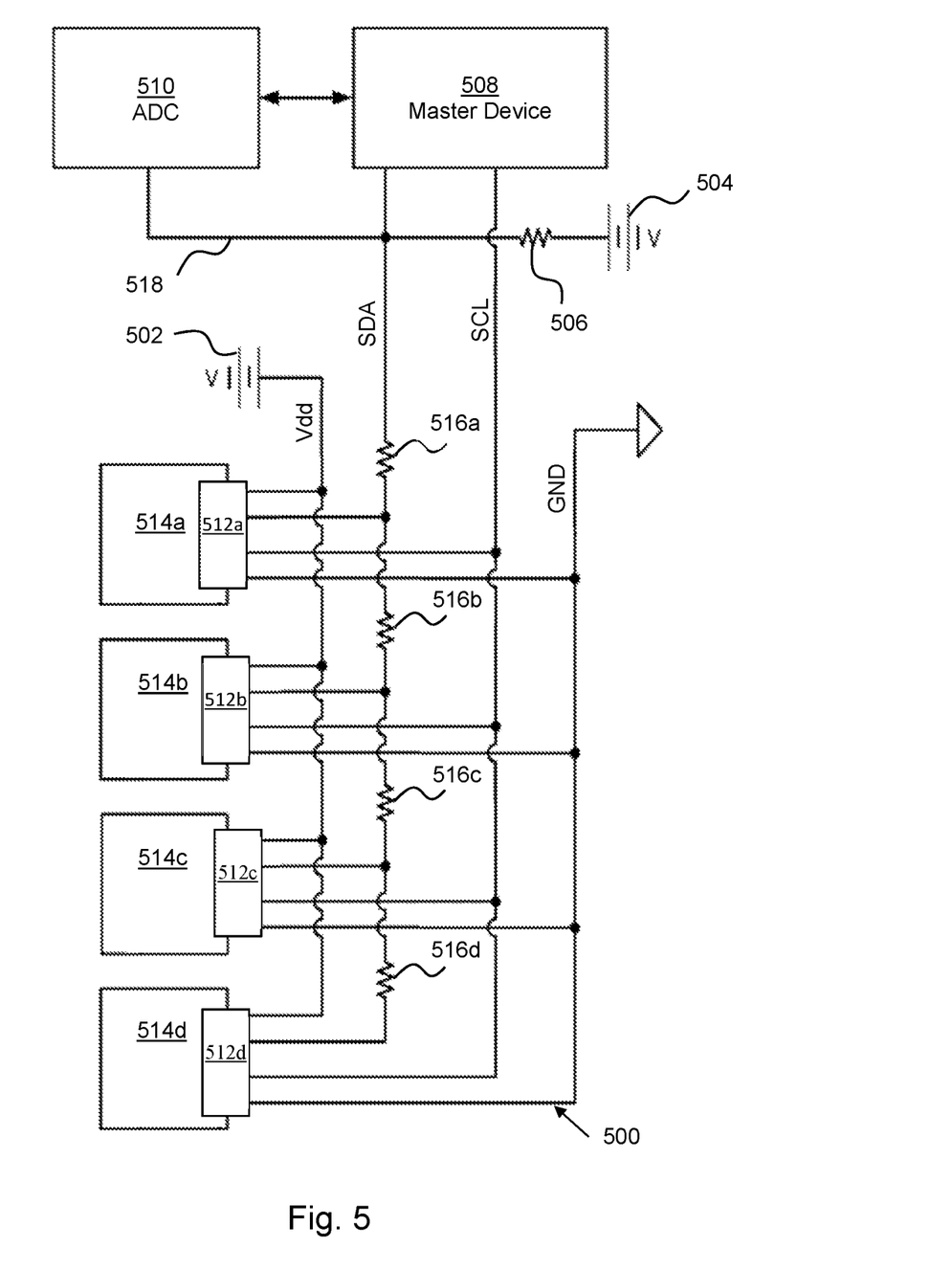
FIG. 5 shows a schematic example of a print apparatus logic circuitry and logic circuitry associated with replaceable print apparatus components connected to a serial bus.

FIG. 5 shows an example of a serial bus 500 comprising four lines in total: two active lines, SDA and SCL, as described above, a Voltage source connection Vdd and a ground connection GND. The active lines are bi-directional. The Voltage source connection Vdd is connected to first voltage source 502 and the SDA line is connected to a second voltage source 504 via a pull-up resistor 506.

A master device 508, for example comprising a print apparatus controller associated with an Analogue to Digital converter 510 is attached to the bus 500. The bus 500, master device 508 and Analogue to Digital converter 510 may be provided by a print apparatus. The master device 508 comprises processing circuitry associated with (in some examples, provided within) a print apparatus. Four 'slave devices' 512*a-d*, which comprise logic circuitry associated with—in this example affixed to—replaceable print apparatus components 514*a-d* are also attached to the bus 500. In this example, each of the replaceable print apparatus components 514*a-d* comprises an ink cartridge of a given color.

In this example each slave device 512*a-d* attached to the bus 500 has its own unique address, and can be a receiver and/or transmitter. In typical operation, serial clock signals and serial data signals are provided from the master device 508 via the clock signal line SCL and data line SDA, while operational voltage for the slave devices is provided between the voltage source line Vdd and ground line GND. Data signals may also be sent from a slave device 512 to the master device 508.

In an example, a communication which begins with a START condition and ends with the STOP condition may be referred to as an I2C "packet." In an example of a I2C packet sent by the master device 508, this may contain a slave device address, an indication of whether the command is a read or write command (in some examples, these may together make up a byte), a command code (which may be a second byte of data), and, in some examples, any additional command data (for example, additional command parameters, message authentication codes (MACs), cyclic redundancy checks (CRCs), and the like, which may be one or more subsequent data bytes).

In an example of operation when carrying out the method of FIG. 4, the master device 508 may first issue a START condition, which acts as an 'attention' signal to all of the connected slave devices 512. This may for example be characterised by a fall in voltage in the SDA line while the SCL voltage is HIGH. The master device 508 may then send a byte including the address of the slave device 512 that the master device 508 desires to access, and a bit that provides an indication of whether the access is a read or write operation.

After receiving the address byte, all slave devices 512*a-d* will compare it with their own address. If it there is no match, the slave device 512 will generally wait the next START condition that is initiated by the master device 508. If, however, the address matches, the circuitry of that slave device 512*a-d* will receive the subsequent command information and thereafter produce an acknowledge response signal (an "ACK" signal) (which may comprise pulling the SDA line LOW in a particular clock period).

In some examples set out herein, the command may be a command to cause the slave device 512 to generate a low voltage condition for a time period. The low voltage condition may be caused after generation of the ACK response signal. The master device 508 may then generate a STOP condition.

Once the master device 508 receives the acknowledge signal, (and in some examples after generation of a STOP condition), the master device 508 may seek to confirm that the slave device 512 has generated a LOW voltage condition on the SDA (and, in some examples, may cease sending the clock signal on the SCL while this LOW voltage condition is expected).

In this example, a resistive voltage divider network is provided in the SDA of the serial bus 500 to allow electronic determination of the respective physical positions of the slave devices 512. Specifically, a series of divider resistors 516*a-d* are provided on the data line SDA, and there is a connection 518 from the data line SDA to the analog-to-digital converter (ADC) 510. This configuration creates a ladder divider network (or ladder resistor network) that causes the voltage of a signal from each device 512 to vary depending upon the physical position of the device 512, as the devices 512 connect to the divider network at different points. For example, a signal from slave device 512*d* will pass through four of the divider resistors 516, while a signal from slave device 512*a* will pass through only one of the divider resistors 516*a*. By detecting the voltage value, the position of the slave device 512 creating the low voltage condition may be determined. In other words, each slave device 512 creates a different low voltage condition. The voltage may be detected using the ADC 510. The ADC 510 includes circuitry that converts an analog voltage into a digital signal indicative of the voltage level. This digital signal is used by the master device 508 to electronically differentiate the physical location of the slave devices 512 on the bus based upon the voltage level of signals from the slave devices 512. The voltage may be compared to an expected voltage for a device 512 having the addressed used in the command.

The ADC 510 may receive control signals from and provides data to the master device 508 via a communication link (which can be another communication bus). While the ADC 510 is shown separately from the master device 508, the ADC 510 can be part of the master device 508 physically, or it can be in a separate location.

The ADC 510 and the ladder divider network may be configured to operate to allow differentiating location by detecting the voltage order of the devices on the bus 500, without interfering with the identification of HIGH and LOW states used in data transfer. In other words, all the characteristic low voltages produced on the bus by each slave device 512 may be relatively distant from the threshold for characterising each data bit as being HIGH or LOW.

To consider one example, the master device 508 can be configured to detect any signal below a threshold value to be a LOW voltage condition when receiving data. For example, any voltage below 2V, or below 1V, when a SCL voltage is HIGH may be identified as a LOW data bit (in some examples, a 0), whereas values above this threshold may be identified as a HIGH data bit (in some examples, a 1). In some examples, the threshold for detecting a LOW data bit is a voltage below 1.3 V.

However, the master device 508, using the converted voltage from the ADC 510, can be configured to distinguish between specific signals that are below this threshold and some amount above zero (or nominally 0V) (e.g. up to around a few hundred millivolts (mv)) to allow positional identification. Each divider resistor 516 may have a resistance sufficient so that the voltage created between the sum of the divider resistors 516 and the pull-up resistor 504 is a voltage below the LOW voltage threshold. However, the resistance of the divider resistors 516 may be selected to be small enough that identification of HIGH voltage signals from the master device 508 during normal operation is not unduly compromised—i.e. the HIGH voltage remains relatively close to the maximum voltage provided by the second voltage source 504.

In one embodiment, the divider resistors 516 each have a resistance of about 51 ohm, though this is only one of many resistance levels that can be used, and the resistance levels may vary between the different resistors 516. In such an example, the first and second voltage sources 502, 504 may each provide around 3.3 volts and the pull-up resistor 506 may be a resistor of around 1000 ohm (1 Kohm), i.e. significantly larger resistance value than the divider resistors 516.

In other words, the divider resistors 516 could act as individual 'additional' pull up resistors on the SDA line, preventing it from falling to a nominal 0V. This may provide, for example a voltage difference of around 100-200 mV given the values specified above. This may be measured in terms of 'counts' by the ADC 510. For example, in a 3.3V system, where a 9-bit ADC is provided, this in turn means each count represents around 6 mV (which is determined by dividing 3.3V by 512). Therefore, the ADC 510 may be expected to register around 20 counts for the lowest voltage cartridge to around 80 counts for the highest voltage.

As noted above, it may be the case that at least some replaceable print apparatus components may have their position verified using mechanical keying rather than the methods set out herein. Therefore the number of voltage levels detected may be less than the number of, for example, print supply cartridges used.

It may be noted that, as there are particular addresses associated with the replaceable print apparatus components 514*a-d*, a specific command may be sent to, say 514*a*, the voltage sampled and then the process repeated for each of the replaceable print apparatus components 514*b, c* and *d* in turn. If the replaceable print apparatus components 514*a-d* are in their expected locations, there may be expected to be a progressive change in the voltage value from lower to higher if measured in that order. However, if the replaceable print apparatus components 514*a-d* are not in the expected locations, this pattern (or more generally, the expected relative voltages) will not be seen and a warning may be generated.

In practise, the time period for which the SDA line is held low may exceed a sampling time period. For example, a slave device 512 may be commanded by the master device 508 to hold the SDA line low for 50 ms. During this time, the data line SDA may be sampled a certain number of times—for example, between 3 and 10 times—by the ADC 510 of the host apparatus. In some examples, if at least one of these readings is not within a certain threshold range, the command may be run again and new samples may be acquired. In other examples, samples may be taken until there is a threshold number of 'good' samples. In some such examples, there may be a maximum number of samples permitted before an error state is declared—for example, samples will continue until 5 samples have been acquired which are within an expected range or a maximum of 10 samples have been taken. If no 'good' set of samples is acquired, an error may be indicated. The samples may be averaged to generate a representative value for that replaceable print apparatus component 514*a-d*.

The sampling period may be relatively short. For example, after the slave device 512 has been commanded to hold the SDA line low, the master device 508 may wait before sampling the bus to allow the bus to settle (for example, for around 10 ms). Acquisition of samples may take place within around 1 ms. However, the SDA line may be held low for a longer period, for example 50 ms, to allow for retesting or the like. This period may be specified in, or in some examples associated with (for example by reference to a lookup table or register held in the slave device 512) the first command.

Therefore, it need not be the case that the SDA line is held low for the entirety of a time period specified by or in the first command, where applicable. However, it may be the case that, at least statistically, the slave device 512 is to hold the SDA line low such that the sampling period is likely to occur during the time for which the SDA line is held low, on at least one of a permissible set of trials.

It will be appreciated that the SDA line could be held low by, in effect, sending a data signal made of a succession of data bits associated with a low voltage state (for example, a succession of 0 bits). This will result in the SDA line being held low for a time period. However, when sending a data signal, the slave device 512 may refer to the signal on the SCL, rather than its own internal timer, to determine when to release the SDA line to allow it to return to a HIGH state (i.e. when to remove the low voltage condition, such that the serial data bus assumes a different, high and/or default, voltage state or condition). However, in the methods set out herein, the low voltage condition applied following the first command is applied independently of any clock signal on the SCL bus (and in some cases in the absence of any such clock signal on the SCL bus).

Figure 6:
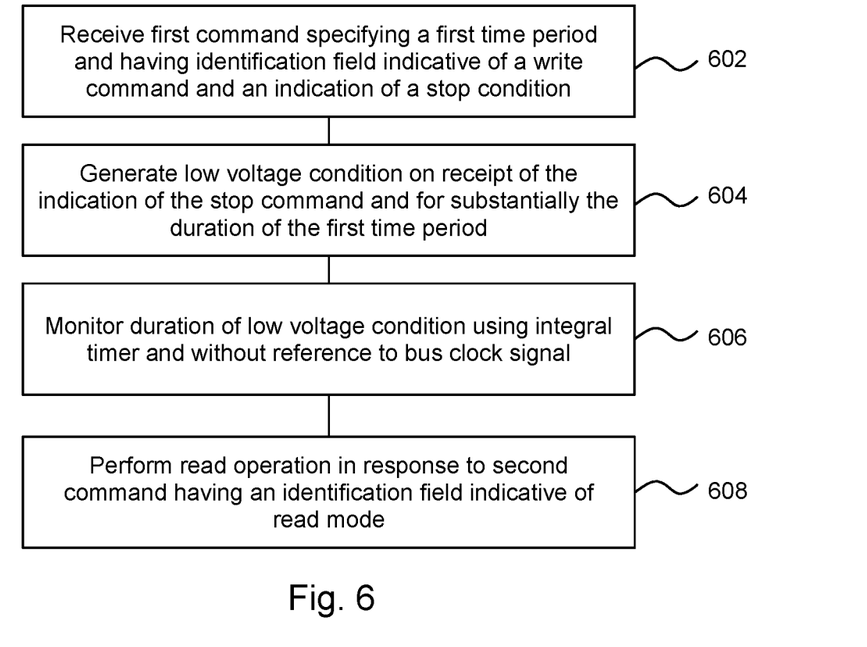
FIG. 6 shows an example of another method of operation of logic circuitry associated with a replaceable print apparatus component.

FIG. 6 shows another example of a method of operation of logic circuitry (for example, a logic circuitry package as described above) associated with a replaceable print apparatus component. In this example, in block 602, the logic circuitry receives, via an I2C data bus, a first command which specifies a first time period. In this example, the first command also comprises an indication of START condition, an address of a logic circuitry package, an identification field indicative of a write command and an indication of a stop condition (for example, a rising voltage on a data line during a HIGH portion of a clock pulse).

In some examples, the time period may be selected based on attributes of the host device, or the circuitry thereof. In general, a time period may be sufficiently long to allow good samples to be captured, but not so long as to unduly lengthen the time taken to verify a position of the replaceable print apparatus component.

Block 604 comprises generating, by the logic circuitry, a low voltage condition on a serial data line of an I2C bus following receipt of the indication of the STOP condition (which itself follows the transmission of the command) and for substantially the duration of the first time period. As noted above, while in some examples, the low voltage condition may be generated for the whole of the time period, in some examples, the method may comprise allowing the serial data line to 'float high' during part of the first time period, i.e. the line may be held low in an interrupted fashion. In some examples, the serial data line may be held low for at least 60% of the first time period, or at least 70% of the first time period, or at least 80% of the first time period, or at least 90% of the first time period, or at least 95% of the first time period. In some examples, the voltage is held low for a sufficient proportion to reliably coincide with a sampling period. The duration of the low voltage condition comprises at least one sampling period, wherein the sampling is carried out by processing circuitry of a print apparatus, as has been described above. In addition, if the data line is held low for an unduly long time period as this blocks communications and may for example cause a host apparatus to generate a timeout error or the like.

Generating the low voltage condition following receipt of the STOP condition indication means that the bus will not be blocked during on-going transmission of a data packet.

In this example, generating the low voltage condition coincides with a state in which there is no clock signal on the serial data bus, and block 606 comprises monitoring the duration of the low voltage condition using an integral timer of the logic circuitry.

The method further comprises, in block 608, in response to a read request having an identification field indicative of a read mode, performing, by the logic circuitry a read operation. In other words, in addition to the special features described herein, the logic circuitry may function as an I2C slave device. The logic circuitry may exhibit other features of an I2C slave device, for example taking part in authentication and/or validation exchanges, receiving or acting on read and/or write commands, undertaking processing tasks and the like.

Figure 7:
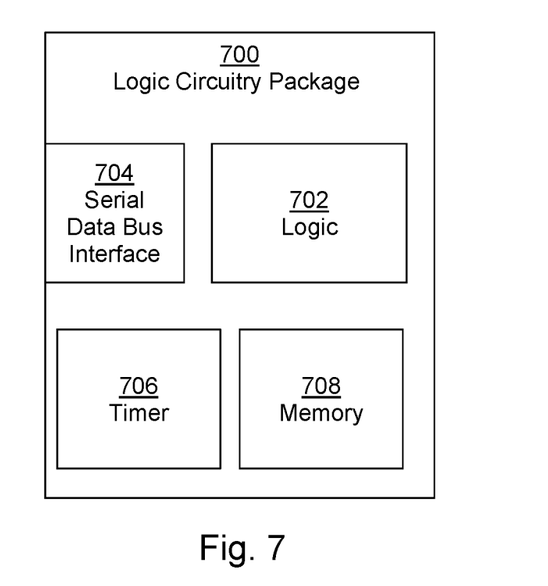
FIG. 7 shows an example of a logic circuitry package.

FIG. 7 is an example of a logic circuitry package 700 for association with a replaceable print apparatus component comprising logic 702, a serial data bus interface 704, a timer 706 and, in this example, a memory 708. In use of the logic circuitry package 700, the logic 702, in response to a first command sent to the logic circuitry package 700 via a serial data bus connected to the serial data bus interface 704, the logic circuitry package 700 in this example is configured to generate a low voltage condition on the serial data bus and monitors the duration of the time period using the timer 706. In some examples, the timer 706 may be in communication with the logic 702, for example via a wired or wireless link. In some examples, the timer 706 may be provided on a common substrate with the logic 702.

In some examples, the logic 702 may be configured to monitor the duration of the time period without reference to a clock signal of the serial data bus. The serial data bus interface 704 may comprise an I2C data bus interface.

The first command may specify a time period, and the logic 702 may be configured to generate a low voltage condition on the serial data bus for substantially the duration of the first time period. The logic 702 may carry out any aspects of the methods described in relation to FIGS. 4 to 6 above.

In response to a second command, the logic 702 may be configured write data received via the serial data bus interface 704 to the memory 708. In response to a read request, the logic 702 may be configured to read data from the memory 708 and to transmit a data signal via the serial data bus interface 704.

Figure 8:
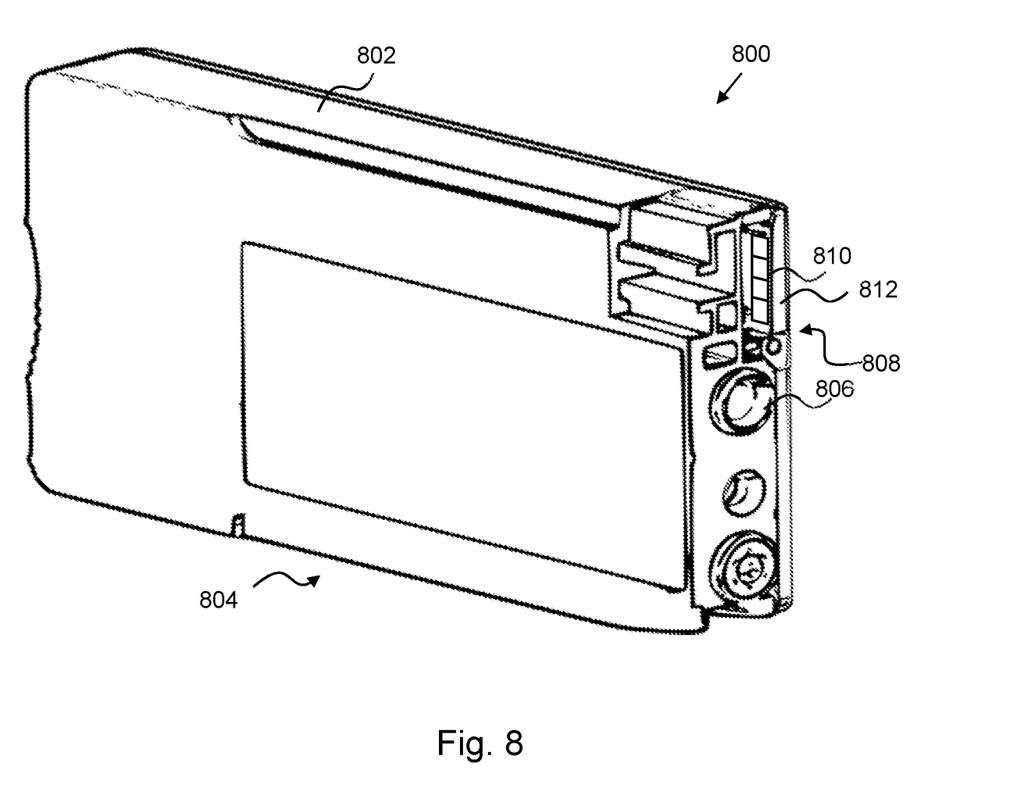
FIG. 8 shows an example of a replaceable print apparatus component comprising a logic circuitry package.

FIG. 8 shows an example of replaceable print apparatus component comprising a logic circuitry package as shown in FIG. 7. In this example, the replaceable print apparatus component is a print cartridge 800 having a housing 802 that has a width less than its height. A print liquid output 804 (in this example, an outlet provided on the underside of the cartridge 800), air input 806 and recess 808 are provided in a front face of the cartridge 800. The recess 808 extends across the top of the cartridge 800 and I2C bus contacts 810 of a logic circuitry package 812 (for example, a logic circuitry package 700 as described above) are provided at a side of the recess 808 against the inner wall of the sidewall of the housing 802 adjacent the top and front of the housing 802. In this example, the logic circuitry package 812 is provided against the inner side of the sidewall.

Examples in the present disclosure can be provided as methods, systems or machine readable instructions, such as any combination of software, hardware, firmware or the like. Such machine readable instructions may be included on a machine readable storage medium (including but is not limited to disc storage, CD-ROM, optical storage, etc.) having machine readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least some blocks in the flow charts and block diagrams, as well as combinations thereof can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry may execute the machine readable instructions. Thus, functional modules of the apparatus and devices (for example, logic circuitry and/or controllers) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a machine readable storage (e.g. a tangible machine readable medium) that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfill the functions of several units recited in the claims.

The features of any dependent claim may be combined with the features of any of the independent claims or other dependent claims.

STATEMENTS

In some examples, the method may be described by any of the following statements:

Statement 1. A method comprising, in response to a first command sent to an address of logic circuitry associated with a replaceable print apparatus component via a serial data bus,
  generating, by the logic circuitry, a low voltage condition on the serial data bus; and
  monitoring a duration of the low voltage condition using a timer of the logic circuitry.

Statement 2. A method according to statement 1 wherein the first command specifies a first time period, and generating the low voltage condition on the serial data bus comprises generating the low voltage condition on the serial data bus based on the first time period.

Statement 3. A method according to statement 2 comprising generating the low voltage condition on the serial data bus for substantially the duration of the first time period.

Statement 4. A method according to any preceding statement comprising generating the low voltage condition on a serial data line of the serial data bus.

Statement 5. A method according to any preceding statement wherein the duration of the low voltage condition comprises at least one sampling period, wherein sampling is carried out by processing circuitry of a print apparatus during the sampling period.

Statement 6. A method according to any preceding statement wherein generating the low voltage condition coincides with a state in which there is no clock signal on the serial data bus.

Statement 7. A method according to any preceding statement wherein the first command comprises an identification field indicative of a write command and an indication of a stop condition, the method further comprising, generating, by the logic circuitry, a low voltage condition on the serial data bus after receipt of the indication of the stop condition.

Statement 8. A method according to statement 7 further comprising, in response to a read request having an identification field indicative of a read mode, performing, by the logic circuitry, a read operation.

Statement 9. A method according to any preceding statement wherein a voltage value of the low voltage condition is indicative of a position of the replaceable print apparatus component in the print apparatus.

Statement 10. A method according to any preceding statement further comprising removing the low voltage condition, such that the serial data bus assumes a different, high and/or default, voltage state or condition.

Statement 11. A logic circuitry package for association with a replaceable print apparatus component comprising:
  logic and a serial data bus interface,
  wherein the serial data bus interface is to interface with a serial data bus of a print apparatus
  wherein the logic is, in response to a first command sent to the logic circuitry package via the serial data bus connected to the serial data bus interface, to generate a low voltage condition on the serial data bus and to monitor a duration of a time period.

Statement 12. A logic circuitry package according to statement 11 further comprising a timer, wherein the logic is to monitor the duration of the time period using the timer.

Statement 13. A logic circuitry package according to any of statements 11 or 12 wherein the logic is to remove the low voltage condition on the serial data bus at the end of the time period.

Statement 14. A logic circuitry package according to any of statements 11 to 13 wherein the logic is configured to, outside of the time period, cause the serial data bus to assume a different, high and/or default, voltage state or condition.

Statement 15. A logic circuitry package according to any of statements 11 to 14 wherein the logic is to output an acknowledge response upon receiving the first command before generating the low voltage condition.

Statement 16. A logic circuitry package according to any of statements 11 to 15 wherein the logic is to monitor the duration of the time period without reference to a clock signal of the serial data bus.

Statement 17. A logic circuitry package according to any of statements 11 to 16 wherein the first command specifies a time period and logic is to generate a low voltage condition on the serial data bus within the duration of the time period.

Statement 18. A logic circuitry package according to any of statements 11 to 17 wherein the logic is configured to generate the low voltage condition for the time period specified in the first command.

Statement 19. A logic circuitry package according to any of statements 11 to 18 wherein the first command specifies a time period and the logic is to generate a low voltage condition on the serial data bus for substantially the duration of the time period.

Statement 20. A logic circuitry package according to any of statements 11 to 19 further comprising a memory, wherein, in response to a second command, the logic is to write data received via the serial data bus interface to the memory.

Statement 21. A logic circuitry package according to any of statements 11 to 20 further comprising a memory, wherein, in response to a read request, the logic is to read data from the memory and to transmit a data signal via the serial data bus interface.

Statement 22. A logic circuitry package according to any of statements 11 to 21 wherein the serial data bus interface is an I2C data bus interface.

Statement 23. A logic circuitry package according to any of statements 11 to 22 configured to
  communicate via more than one I2C address over the same I2C bus interface,
  receive a command associated with temporarily using a different, secondary I2C address, the command including a second time period,
  monitor the second time period, and
  respond to commands directed to the secondary I2C address during the second time period.

Statement 24. A logic circuitry package of statement 22 as it depends on statement 12 wherein logic circuitry package includes a timer and the second time period is monitored using the timer.

Statement 25. A replaceable print apparatus component comprising a logic circuitry package according to any of statements 11 to 24.

Statement 26. A replaceable print apparatus cartridge to connect to a print apparatus, comprising
  a reservoir containing a coloured print material, and
  a logic circuitry package:
    the logic circuitry package including logic and a serial data bus interface,
    wherein the serial bus interface is to connect to a serial data bus of a print apparatus
      wherein the logic is, in response to a first command to determine a location of the replaceable print apparatus cartridge when connected to the print apparatus, the first command sent to the logic circuitry package via the serial data bus connected to the serial data bus interface, to generate a low voltage condition on the serial data bus and to monitor a duration of a time period.

Statement 27. A replaceable print apparatus cartridge of statement 26 further comprising any of the features of any of statements 11 to 25.

Statement 29. A print apparatus comprising a communication bus having a ladder resistor network therein and adapted to receive at least two logic circuitry packages according to any of statements 11 to 25, wherein the logic circuitry packages have different I2C addresses and wherein each package is connected to the bus at a different point in the ladder resistor network so as to generate a different low voltage condition on the bus in response to a predetermined command.

The invention claimed is:

1. A replaceable print material supply cartridge for a printer, the replaceable print cartridge comprising:
 a reservoir defining a volume to contain print material;
 a timer;
 at least one memory;
 an I2C serial data bus interface including a data contact and a clock contact, the serial bus interface to communicate with an I2C serial data bus of the printer; and
 logic circuitry having a particular I2C address to be associated with the print material of the cartridge, the logic circuitry in circuit with the I2C serial bus interface, whereby, when coupled to the printer, the logic circuitry is to:
  respond to a command directed to the particular I2C address, the command specifying a time period and intended to verify the position of the replaceable print material supply cartridge along the I2C serial data bus, to detect a proper installation or an improper installation of the replaceable print cartridge; and,
  facilitate said verifying of the position of the replaceable print material supply cartridge by:
   initiating a low voltage on the data contact,
   monitoring the timer without reference to a clock signal at the clock contact from the serial data bus,
   maintaining the low voltage on the data contact for a duration based on the time period, by monitoring the timer,
   after expiration of the duration, causing the data contact to assume a high voltage, different than the low voltage; and
   in response to a read request after the duration, causing transmission of requested data via the serial data bus interface.

2. The replaceable print material supply cartridge of claim 1, wherein the timer is configured to run at a higher frequency than an I2C clock frequency.

3. The replaceable print material supply cartridge of claim 1, wherein the print material is one of a yellow ink, a cyan ink, or a magenta ink.

4. The replaceable print material supply cartridge of claim 1, wherein the logic circuitry is to output an acknowledge message in response to the command before initiating the low voltage on the data contact.

5. The replaceable print material supply cartridge of claim 1, wherein the command is a first command, and the logic circuitry is to cause data from the serial data bus interface to be written to the at least one memory in response to a second command.

6. The replaceable print material supply cartridge of claim 1, wherein the particular I2C address is a first I2C address, the command is a first command, and the time period is a first time period, and the logic circuitry is to:
 receive a second command via a second I2C address, the second command to identify a second time period,
 monitor the second time period using the timer, without reference to the clock signal over the clock contact, and
 respond to a third command directed to the second I2C address during the second time period.

7. The replaceable print apparatus component of claim 1, wherein a magnitude of the low voltage is indicative of the determined position.

8. A replaceable print material supply cartridge for a printer, the replaceable print cartridge comprising:
 a print material reservoir;
 a timer to count at a frequency irrespective of an I2C clock cycle or a CPU speed of a CPU;
 at least one memory;
 an I2C serial data bus interface including a data contact and a clock contact, the serial bus interface couplable to a serial data bus of the printer;
 an I2C serial data bus address particular to the cartridge; and
 logic circuitry including the CPU and the timer, the logic circuitry to:
  obtain a command including the I2C serial data bus address when coupled to the printer, the command specifying a time period, and the command to determine a physical location along the serial data bus to which the replaceable print material supply cartridge is coupled; and
  in response to obtaining the command, the logic circuitry is to facilitate determining the physical location by:
   initiating a first voltage on the data contact,
   monitoring the timer without reference to a clock signal at the clock contact from the serial data bus,
   maintaining the first voltage on the data contact for a duration of time by monitoring the timer and based on the time period specified in the command, and
   after expiration of the duration, causing the data contact to assume a second voltage, different than the first voltage, and
   after the duration, in response to a read request, reading data from the memory and causing transmission of a data signal.

9. The replaceable print material supply cartridge of claim 8, wherein the first voltage is lower than the second voltage.

10. The replaceable print material supply cartridge of claim 8, wherein the first voltage is approximately 0V.

11. The replaceable print material supply cartridge of claim 8, wherein the logic circuitry is to initiate the first voltage on the data contact at the beginning of the time period.

12. The replaceable print material supply cartridge of claim 8, wherein the command is a first command and the logic circuitry is to read data from the at least one memory and cause transmission of the data signal in response to a second command.

13. The replaceable print cartridge of claim 8, wherein the logic circuitry is to cause removal of the first voltage on the data contact after the end of the time period.

14. The replaceable print cartridge of claim 8, wherein the reservoir includes a non-black print material.

\* \* \* \* \*